US009972019B2

(12) United States Patent
Ramsaier et al.

(10) Patent No.: US 9,972,019 B2
(45) Date of Patent: May 15, 2018

(54) SYSTEMS AND METHODS FOR USING PERSONAS

(75) Inventors: Mark Ramsaier, Corona Del Mar, CA (US); Robert D. Fish, Tustin, CA (US); Patrick Dent, San Pedro, CA (US); Dennis McLeod, Rancho Palos Verdes, CA (US)

(73) Assignee: Robert D. Fish Trust, Irvine, CA (US)

( * ) Notice: Subject to any disclaimer, the term of this patent is extended or adjusted under 35 U.S.C. 154(b) by 1363 days.

(21) Appl. No.: 11/861,956

(22) Filed: Sep. 26, 2007

(65) Prior Publication Data

US 2008/0097849 A1  Apr. 24, 2008

Related U.S. Application Data

(60) Provisional application No. 60/854,417, filed on Oct. 24, 2006.

(51) Int. Cl.
*G06Q 30/00* (2012.01)
*G06Q 30/02* (2012.01)
*G06Q 20/10* (2012.01)

(52) U.S. Cl.
CPC .............. *G06Q 30/02* (2013.01); *G06Q 20/10* (2013.01); *G06Q 30/0271* (2013.01); *G06Q 30/0273* (2013.01); *G06Q 30/0274* (2013.01); *G06Q 30/0277* (2013.01)

(58) Field of Classification Search
CPC ...................................................... G06Q 30/02

USPC ...................... 705/14, 1–10, 14.71; 707/1–20
See application file for complete search history.

(56) References Cited

U.S. PATENT DOCUMENTS

| 6,671,682 B1* | 12/2003 | Nolte ................. G06F 17/30867 |
| 2002/0073165 A1* | 6/2002 | McNulty et al. ............. 709/217 |
| 2003/0131260 A1* | 7/2003 | Hanson ............... H04L 63/0414 |
| | | 713/194 |
| 2005/0165644 A1* | 7/2005 | Beyda et al. ................... 705/14 |

* cited by examiner

*Primary Examiner* — Sun M Li
(74) *Attorney, Agent, or Firm* — Robert D. Fish; Fish IP Law, LLP

(57) ABSTRACT

The present invention provides systems and methods for increasing 3rd party advertising on an interactive site, by assigning characteristics to portions of a website, and using those characteristics to personalize presentation of the website by according to personas of visitors. Persona characteristics can represent any distinguishing feature of interest, including for example, gender, marital status, occupation, interests, race, hobbies, business interests, religious interests, etc. In preferred embodiments a service company handles the creation and maintenance of visitors' personas. The company stores relevant information on the computers of users, and then cooperates with the website operator to access that stored information as needed. In a particularly preferred embodiment personalization can be used to assist in deciding what advertisements to display or not display on a website.

11 Claims, 2 Drawing Sheets

SYSTEMS AND METHODS FOR USING PERSONAS

This application claims priority to U.S. provisional application Ser. No. 60/854,417 filed Oct. 24, 2006.

FIELD OF THE INVENTION

The field of the invention is advertising.

BACKGROUND

Advertising dollars are rapidly moving away from newspaper, magazine, television and other traditional forms of advertising to interactive advertising, most notably interactive advertising on the Internet. In that space hundreds of millions of web sites compete for viewership, by providing content or functionality of interest to their respective audiences. Typically the sites receive income not by direct payment from advertisers, but from third party sources (Google™, Yahoo!™, etc) that channel ads to the websites, and revenue share with the websites on the basis of click-throughs. Advertisers typically pay for click-throughs according to prices determined by an auction system.

The above-described system leaves individual web sites with relatively limited options as to increasing advertising revenue. They can to try to draw additional viewers to their sites, or increase viewing residence time, by improving the content or functionality of the web pages, and they can provide additional space for advertising on the pages. But those goals work at cross-purposes. Improving content usually means providing less advertising space, and visa-versa.

There has been some discussion in the patent literature regarding use of personal profiles and personas to improve web searching. U.S. patent application Ser. No. 11/166,926 entitled "Dynamic Search Processor" addresses that topic, as did its priority documents provisional applications 60/583,294 filed Jun. 25, 2004 and 60/593,034 filed Jul. 30, 2004. These and all other referenced patents and applications are incorporated herein by reference in their entirety. Where a definition or use of a term in a reference, which is incorporated by reference herein is inconsistent or contrary to the definition of that term provided herein, the definition of that term provided herein applies and the definition of that term in the reference does not apply.

But those documents did not squarely address how persona searching could help web sites to improve revenue derived from 3rd party advertising on their sites.

SUMMARY OF THE INVENTION

The present invention provides systems and methods for increasing $3^{rd}$ party advertising on an interactive site, by assigning characteristics to portions of a website, and using those characteristics to personalize presentation of the website by according to personas of visitors. Persona characteristics can represent any distinguishing feature of interest, including for example, gender, marital status, occupation, interests, race, hobbies, business interests, religious interests, etc.

In preferred embodiments a service company handles the creation and maintenance of visitors' personas. The company stores relevant information on the computers of users, and then cooperates with the website operator to access that stored information as needed. That strategy allows for globalization of the personas, at least to the extent that some or all of the underlying information is available to other interactive web sites. It is also contemplated that the service or a related entity can provide software through which visitors can expressly identify themselves as having previously stored personas, or as being interested in storing personas.

Personalization can take place in many ways. For example, personalizing could be used to filter out adult material, to restrict or gain access to particular web pages, or for implying or filtering out key words in a search.

In a particularly preferred embodiment personalization can be used to assist in deciding what advertisements to display or not display on a website. That feature is particularly advantageous to website owners who derive revenue from advertising. They have limited advertising "real estate", and naturally want to maximize the revenue from that space by more closely tailoring the advertisements to the characteristics of the visitors. Although any suitable characteristics could be used, preferred characteristics are the previously stored persona characteristics. Other contemplated characteristics are restricted advertisers, which can advantageously be at least partially specific to the site.

Another aspect of the inventive subject matter includes tracking what content is being displayed by persons having various personas, and charging $3^{rd}$ party advertisers for summary information that associates content with those personas. Advertisers can thus obtain potentially valuable insight into the characteristics of visitors who view particular materials, or visit particular web sites and web pages. Here again, the personas can be globalized for use on multiple sites, so that the visitors do not need to maintain different personas for different sites.

Still another aspect of the inventive subject matter includes comparing revenue obtained from a given web site before and after implementation of a system that associates persona characteristics with a content element of the site, and revenue sharing a portion of the difference. The measurements and revenue sharing can be done on any suitable level of granularity, down to a web page level and below. It especially contemplated that revenue sharing web sites will encourage web users (also referred to as "visitors herein" to identify themselves using personas.

From a visitor's standpoint, the contemplated systems and methods improve their ability to control their web experience, without having to customize each and every website they visit. Moreover, the contemplated systems and methods allow the visitors to shift with ease among different personas, and see that current persona be implemented throughout cooperating websites. And, at least in preferred embodiments there is an added measure of privacy that should be desirable to the visitors; the personas are created and modified by the visitors themselves, not by computer tracking their web habits.

BRIEF DESCRIPTION

DETAILED DESCRIPTION

Figure 1:
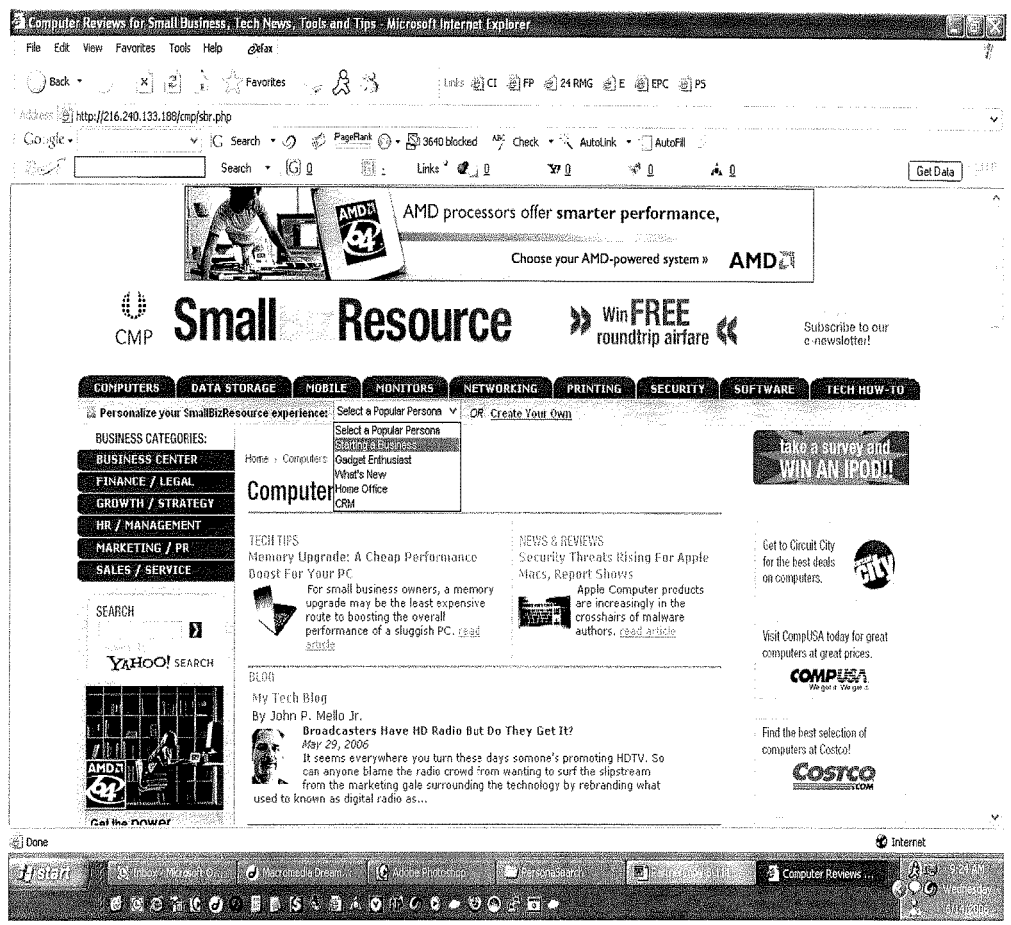
FIG. 1 is a mock up of a web page customized by application of Persona characteristics.

Those skilled the art will readily appreciate that the systems and methods contemplated herein could be implemented under any brand name or names. For simplicity of description, however, such systems and methods will be described with respect to a particular implementation under the real-world mark, iPersona™.

In general, iPersona software can be thought of as increasing the "stickiness" of publisher web sites to visitors by providing more personalized, relevant content selection. Increased relevance of displayed content to visitors results in more page views per unique visitor session and promotes more return visits. Additional page views increase partner/publisher web site ad revenue and also increases the opportunity to sell products through a more targeted commerce experience. With iPersona every user's multiple areas of interest are personalized, thereby providing greater relevance of web site content. This results in revenue for iPersona by providing enhanced content selection, reporting, and precision targeting of online ads.

In preferred embodiments the relevant software can be simply and quickly installed on top of any web site. The software product enhances the relevance of content selection, enables demographic reporting, and facilitates the targeting of banner ads and pay per click search results to active "Personas" across the entire Internet. It is contemplated that the technology can be delivered in any suitable manner, including for example, through partnerships with content publishers and e-commerce portals.

In a typical implementation, web users can voluntarily create and save their own "Personas," specifying their unique and changing goals, interests and settings. Users can create one or multiple Personas, reflecting the premise that all users are not a single, static "personality," and their goals and objectives change in different business or personal situations. For example, as a user browses to the "music" channel at www.AOL.com with a "classic rock" Persona defined, the content provided would match that criteria and would be vastly different from a Persona defined with "hip-hop." In addition, web users can define Personas with different goals for family members or others to enhance targeted discovery for third parties.

Preferably, web users can create their Personas in a privacy-friendly environment with full opt-in and opt-out controls. This is another element that sets iPersona apart from other content personalization and ad targeting companies. All demographic and psychographic persona information is stored and managed by iPersona. No other web site has access to that information.

A. Revenue Generation

Revenue is contemplated to be generated in any of three main ways: (1) Publishers pay for incremental page views generated by visitors as a result of iPersona personalization; (2) publishers purchase visitor activity reports, including demographics, for advertisers who wish to maximize their Return On Investment (ROI); and (3) advertisers pay for the capability to target specific advertisements to visitors according to their Personas.

Contemplated application partners include online publishers who produce revenue from advertising sales and delivery, product transactions, or subscription services. These entities can reap the following benefits:

Content Selection—contemplated systems can easily install on any web site (1 point of integration), such as a content publisher, social networking or special interest site. In combination with the partner site, this enables the automatic dynamic display of Web Site content corresponding to user-defined interests, demographics, and personal objectives. On-site search is enhanced to increase relevance of site content results. The visitor's user experience is enriched, increasing the revenue potential of the partner site through more page views and return visits.

Commerce—contemplated systems can quickly installs on any e-commerce web site (1 point of integration). Enables personalized shopping/purchasing recommendations based on a visitor's pre-defined interests, settings, and purchase/browsing goals. By matching relevant products to the user's persona-defined needs, this allows the partner to increase revenue from transactions through a higher conversion rate.

Consumers, i.e., visitors to the web sites, can also benefit as follows:

Employing easy-to-use tools, a web site visitor can develop one or multiple profiles (known as Personas) containing personal goals, settings, and interests. These Personas travel with the user across the web.

Advanced iPersona relational database methodology extracts concepts from Personas and builds relevant content linkages. Personas can be saved and interact with any partner site.

Each iPersona-enabled partner site provides a focused, personalized web experience.

A single-click, opt-in process does not require formal registration, provides individual user control, and protects privacy.

For Advertisers and Publishers the benefits are contemplated to include:

The technology can enhance publisher content selection, such as product or articles lists, and/or search results by applying information from a user's chosen Persona(s). For example, an advertisement could include code that will "ask" whether a persona cookie resides on the user's computer, and could provide the user with different information (or even a completely different link) depending upon the persona. Since this increases the value of the ad to the user, this is expected to increase the number of "page views" the unique visitor will request, thereby dramatically increasing the ad serving opportunity, which drives publisher revenue.

The technology can provide detailed ad reporting that reaches across the entire web without behavioral tracking of individuals. Tracking of Personas is not limited to a publisher's "closed" network of partner sites but reports on ad interaction with any Persona anywhere on the web.

The technology can provide superior demographic and dynamic contextual ad targeting without behavioral tracking or fixed boundaries of traditional contextual selection.

Figure 2:
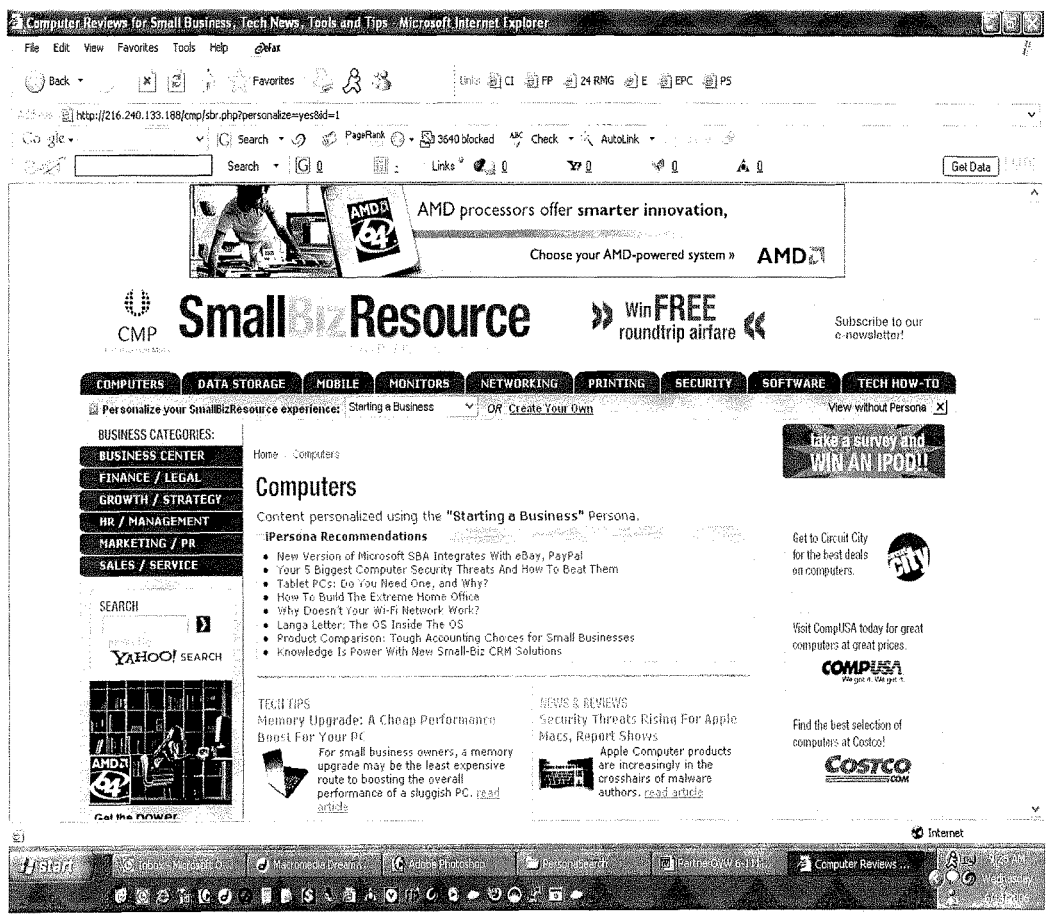
FIG. 2 is a mock up of a web page resulting from a user choosing a "quick pick" Personas.

The technology can enable publishers to customize Web page content and/or presentation of navigation choices by applying Persona characteristics with non-obvious related subject matter, products and services. Publishers can create a "My _____ Publisher" experience for any content page by linking Personas to a unique visual representation of content selection. An example is shown in FIG. 1. Selection of any of the "quick pick" Personas might result in a display such as that of FIG. 2.

B. The Technology

The implementation by iPersona™ focuses on storing attributes of site visitors in personas, and helping web site owners increase their revenue by using the personas to target information to those visitor through use of the personas. These core functions can be thought of as encompassing three primary processes:

Allowing visitors to create Personas that travel with the user across multiple Web sites;

Using information from the Personas to enrich the visitor experience by delivering highly relevant content matching the user's interests and goals. This powerful content personalization is achieved through proprietary technology that performs semantic and conceptual analysis of personas and publisher sites;

Using Persona information to target advertisements to user subject interests and demographics.

When users come to an iPersona-enabled site, visitors have the option to use a previously defined Persona or create a new one. For example, when a user comes to SmallBiz Resource.com, iPersona code detects that the user has previously defined two personas. A simple, integrated interface allows them to select either persona from a drop-down menu. Alternately, the user can choose from a list of "popular Personas"—a list that has been custom built for that site based on available concepts.

If users have not previously defined a Persona, or want to create a new one, they can use the integrated iPersona interface to build a new Persona. The choices that users make about their subject interests, search goals and demographics constitute the new Persona. Users can also define new attributes and characteristics for Personas on-the-fly.

Competitive Advantage: Low-Cost Content Personalization, Demographic Reporting and Ad Targeting Across the Web There are a number of unique selling points associated with iPersona that provide key competitive advantages:

Affordable Content Personalization: Web publishers can implement a content personalization strategy through a low-cost, pay-as-you go licensing model based on incremental page views resulting from the iPersona technology rather than a large upfront licensing fee and tens of thousands of dollars spent on programming.

Ease of Deployment: Unlike other content personalization technologies that require long and involved development timelines and a great deal of financial commitment for programming resources, iPersona is fast, easy, and painless (an easily installed configuration file and one line of code for on-page integration).

Universal Content Personalization: The iPersona content personalization can be applied to any content on the page: Articles, e-commerce, directory listings, search results, video, audio, and advertising.

Full Web Analytics: A complete suite of reporting tools providing intelligence regarding user behavior on a single web publisher's site or network of sites, including page views, visits, path analysis, transaction summaries, ad views, clicks, and more with overlays from relevant Personas including, demographics, personal interests and characteristics, and geographical location.

Ad Targeting: Superior ad-targeting based on explicitly communicated characteristics rather than contextual or behavioral assumptions.

Privacy Friendly: Users opt-in to the iPersona technology rather than being tagged by a third-party cookie without their knowledge. The iPersona technology is implemented with full knowledge by the user and features the ability to opt-out at any time.

Portability: Active Personas are applicable on all sites enabled with the iPersona technology. Therefore, a Persona created on one host site will be equally valid on another site containing the iPersona technology. In addition, Personas can be easily moved from one computer to another so users do not have to recreate their Personas.

Easy Integration into Ad Serving Networks: Ad campaigns can be easily trafficked through ad serving networks using iPersona iframe, ilayer, or Javascript tags, providing internet advertisers with the ability to communicate their marketing messages to the Personas of their choice, regardless of whether those Personas are viewing iPersona affiliates or not. iPersona can track, report on, and serve targeted ads to users across the Web. User Personas are detected in one of four ways: (a) Sites that integrate iPersona, (b) sites that carry advertising that is affiliated with a partner ad network, (c) sites that are directly partnered with iPersona and serve their own ads, and (d) sites that carry ads from companies directly working with iPersona.

iPersona technology also creates a perfect entry point to capture demographic and psychographic data of Web users while maintaining their privacy. This allows Web publishers, ad networks, and e-commerce sites to offer more detailed reporting and specific audience targeting to advertisers at a price premium.

C. Modules

It is currently contemplated that the technology can best be implemented in stages, for example, as follows:

Charge a license fee for the personalization technology. The publisher will pay a CPM fee for those pages requested by a visitor's browser that has been modified using the iPersona Software. This stage involves no upfront publisher investment.

Charge a CPM fee for advanced ad reporting. iPersona will release an advanced ad reporting module that will give advertisers detailed information beyond clicks and impressions.

Charge a CPM fee for advanced ad targeting. iPersona will provide an ad-targeting module that enables advertisers to show their ads to specific personas.

Thus, systems and methods for using personas to increase $3^{rd}$ party ad revenue have been described. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of enhancing a visitor's experience in interacting with a host website, comprising:

discovering a current persona selected by the visitor from a persona managing service, wherein the current persona has at least one persona characteristic selected from the group consisting of goals, interests, and user-set weightings;

using a first computer system to produce multiple composite web pages, and establish navigation among the multiple composite web pages, by automatically combining elements of the host website with content of a third-party merchant, wherein (a) the host website is different or separate from a search engine web site, and (b) such combination is based upon semantic and conceptual matching between potential web page content of the third-party merchant, and the at least one persona characteristic; and rendering the composite web pages on a second computer system being used by the visitor.

2. The method of claim 1, wherein at least one of the composite web pages includes a $3^{rd}$ party advertisement selected at least in part based upon the at least one persona characteristic.

3. The method of claim 2, further comprising including a code in the $3^{rd}$ party advertisement that triggers asking the visitor a question.

4. The method of claim 2, further comprising including code in the $3^{rd}$ party advertisement that tailors a link used by the visitor.

5. The method of claim 1, wherein the step of discovering the current persona comprises using a $3^{rd}$ party service company to discover the current persona.

6. The method of claim 1, wherein the step of discovering the current persona comprises asking the visitor to identify the current persona after landing upon the host web site.

7. The method of claim 1, wherein the step of discovering the current persona comprises obtaining the current persona from a globalized persona.

8. The method of claim 1, wherein the step of producing using a first computer system to produce multiple composite web pages comprises automatically modifying the content using a key word filter.

9. The method of claim 1, further comprising producing at least one of the composite web pages at least in part by matching a site characteristic with the at least one persona characteristic.

10. The method of claim 1, wherein the step of discovering the current persona comprises selecting the current persona from a list of popular personas.

11. The method of claim 1, further comprising a persona managing service that provides an interface through which the visitor can define a new characteristic of the current persona.

* * * * *